(12) United States Patent
Miyasaka et al.

(10) Patent No.: US 8,395,703 B2
(45) Date of Patent: Mar. 12, 2013

(54) DISPLAY CONTROLLER AND DISPLAY APPARATUS

(75) Inventors: Daigo Miyasaka, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 12/526,999

(22) PCT Filed: Feb. 6, 2008

(86) PCT No.: PCT/JP2008/051963
§ 371 (c)(1),
(2), (4) Date: Sep. 14, 2009

(87) PCT Pub. No.: WO2008/099737
PCT Pub. Date: Aug. 21, 2008

(65) Prior Publication Data
US 2010/0020237 A1    Jan. 28, 2010

(30) Foreign Application Priority Data
Feb. 16, 2007 (JP) .................... 2007-036443

(51) Int. Cl.
*H04N 5/04* (2006.01)
*H04N 9/475* (2006.01)
*H04N 5/445* (2006.01)

(52) U.S. Cl. .............. 348/500; 348/512; 348/563

(58) Field of Classification Search .............. None
See application file for complete search history.

(56) References Cited

U.S. PATENT DOCUMENTS

| | | | |
|---|---|---|---|
| 6,980,177 B2 * | 12/2005 | Struyk | 345/8 |
| 7,164,779 B2 * | 1/2007 | Yerazunis et al. | 382/100 |
| 2006/0221067 A1 * | 10/2006 | Kim et al. | 345/204 |

FOREIGN PATENT DOCUMENTS

| | | |
|---|---|---|
| JP | 63-312788 A | 12/1988 |
| JP | 63312788 A2 | 12/1988 |
| JP | 6-110403 A | 4/1994 |
| JP | 6-118927 A | 4/1994 |
| JP | 06110403 A2 | 4/1994 |
| JP | 06118927 A2 | 4/1994 |
| JP | 6-175631 A | 6/1994 |
| JP | 06175631 A2 | 6/1994 |
| JP | 7-219489 A | 8/1995 |
| JP | 07219489 A2 | 8/1995 |
| JP | 2001-255844 A | 9/2001 |
| JP | 2001255844 A2 | 9/2001 |

OTHER PUBLICATIONS

Morihiro, et al. "Image Display Device," JP 63312788 A, Dec. 21, 1988, Translated by FLS, Inc. in Jun. 2011.*
Yerazunis, W.S.; Carbone, M., "Privacy-Enhanced Displays by Time-Masking Images", Australian Conference on Computer-Human Interaction (OzCHI), Nov. 2001.*
Shoemaker, G.B.D.; Inkpen, K.M., "Single Display Privacyware: Augmenting Public Displays with Private Information," SIGCHI'01, Mar. 31-Apr. 4, 2001.*
International Search Report for PCT/JP2008/05193 mailed May 20, 2008.
Office action in counterpart JP patent application 2008-558063, dated Jun. 5, 2012.

* cited by examiner

*Primary Examiner* — Jung Kim
*Assistant Examiner* — Robert Leung

(57) ABSTRACT

A display controller 102 sequentially outputs at least two image signals, thereby allowing an image to be displayed on a liquid crystal display section 105 in accordance with the image signals, wherein among the image signals to be outputted, an image signal of a first output image and an image signal of a second output image have a relationship that provides an image having no correlation to the first output image when image brightness values of the respective signals are added for each pixel, and wherein a frame frequency when the image signal is outputted is an integral multiple of a frame frequency for an image signal of an input image, the integral multiple being two or more.

26 Claims, 12 Drawing Sheets

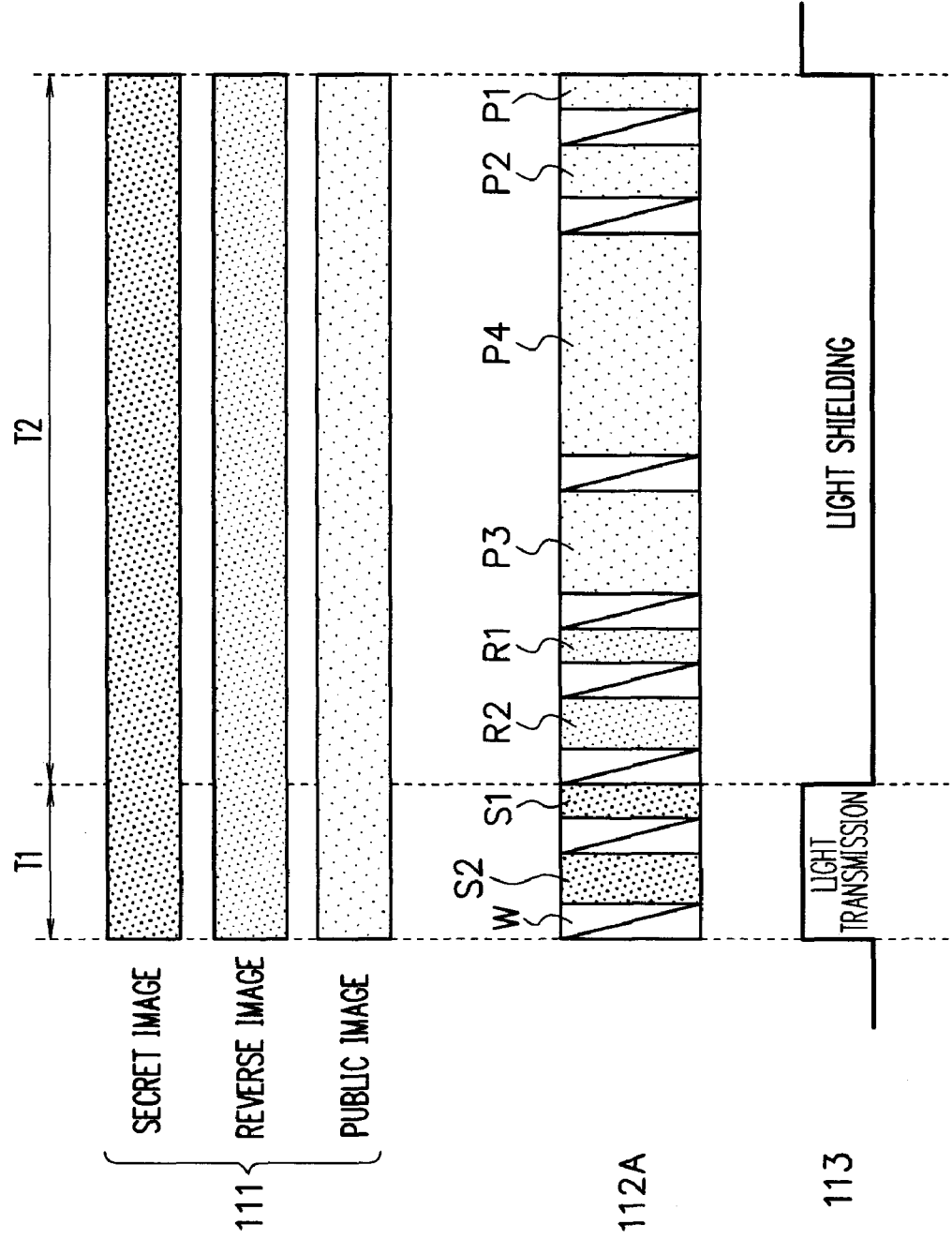

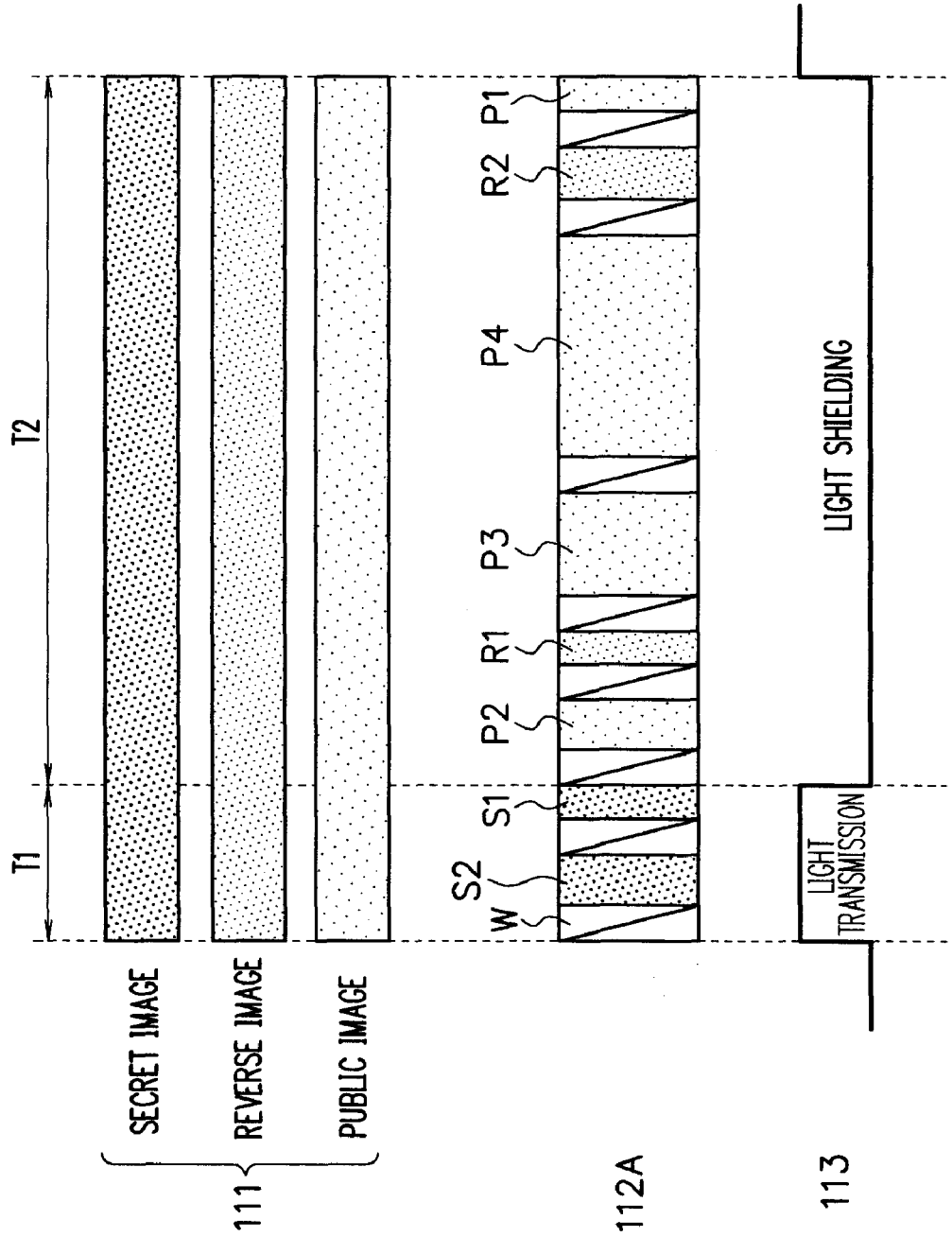

DISPLAY CONTROLLER AND DISPLAY APPARATUS

This application is the National Phase of PCT/JP2008/051963, filed Feb. 6, 2008, which is based upon and claims priority to Japanese Patent Application No. 2007-036443, filed on Feb. 16, 2007, the disclosure of which is incorporated herein by reference in its entirety.

TECHNICAL FIELD

The present invention relates to a display controller and a display apparatus, and in particular relates to an apparatus for presenting contents to a specific user/authorized person.

BACKGROUND ART

Flat-panel displays, including a liquid crystal display and a plasma display, have been applied to a wide variety of apparatuses from a mobile device such as a portable telephone terminal to a large apparatus such as a public display installed on the street. In most of such displays, the focus of development is placed on points such as wide viewing angle, high brightness, and high image quality, and a display that is clearly and easily visible from any angle has been demanded.

On the other hand, contents displayed on a display include contents such as secret information and/or private data not desired to be seen by other people. Hence, in the current circumstances in which ubiquity is advancing with the development of information devices, it is also an important challenge to prevent other people to see displayed contents even in a public situation in which unspecified people are present.

In addition, even at a place such as an office where only specified people are present, there are occasions when a person handles secret information not desired to be seen by a person passing through behind his or her seat.

Devices such as portable telephone terminals include a device equipped with a display that allows displayed contents to be viewed only from a specific direction by providing an optical shield plate (louver). However, displayed contents can be still stealthily seen from directly behind a user, and therefore, such a device is not adequate for providing security protection.

Techniques related to the solution of these problems include an "image display apparatus" disclosed in Patent Document 1. In this image display apparatus, a user is made to wear an eyeglass having an image selection function, thereby allowing a specific image (hereinafter, referred to as a "secret image") to be viewed only by a person (user) who wears the eyeglass, and presenting another image (hereinafter, referred to as a "public image") to other people.

Specifically, the image display apparatus shown in FIG. 1 accumulates an input image signal 11 for a single frame in an image information accumulation memory 12 based on a frame signal 13. Thereafter, image information is read from the memory 12 at a speed twice as fast as that of a frame period (i.e., image information is read twice during a single frame period), the initially read signal is compressed to one-half and inputted as a first image signal 14 to a synthesis circuit 15, and the subsequently read image signal is subjected to chroma and brightness conversion and then inputted as a second image signal 17 to the synthesis circuit 15. Accordingly, the first image signal 14 and the second image signal 17 are alternately displayed on an image display device 18.

On the other hand, the frame signal 13 is also inputted to an eyeglass shutter timing generation circuit 19. The eyeglass shutter timing generation circuit 19 drives a shutter of an eyeglass 21, and controls the eyeglass shutter so as to prevent an image formed based on the second image signal 17 from being seen from a user.

With such configuration and operation, a person who is not wearing the eyeglass 21 will see a gray image or a third image (public image) which is a synthesized image resulting from the first image signal 14 and the second image signal 17 and irrelevant to the first image signal 14, while a person who is wearing the eyeglass 21 will see a desired image (secret image) formed based on the first image signal 14.

Further, the other techniques related to the solution of the above-mentioned problems include a "Secure method for providing privately viewable data in a publicly viewable display" disclosed in Patent Document 2. The method disclosed in Patent Document 2 allows only an authorized user to decipher a private image (secret image) on a display, and at the same time presents, as a public image, an image such as a simple random pattern or unreadable pattern or a screen saver image to an unauthorized user.

In order to promote this object, in the invention disclosed in Patent Document 2, an image processing technique including a data hiding pattern and an alternating pattern is synchronized with a display into which an image formed by the image processing technique is incorporated (for example, the image processing technique is combined with a wearable device such as active glasses). Finally, with the use of a human visual system's "known ability to merge a dissimilar image into a single image", the ability to provide data viewable privately on a display viewable by general public is completed.

Thus, in the inventions disclosed in Patent Document 1 and Patent Document 2 described above, images are switched at a high speed; therefore, so as not to allow a flicker to be sensed, the frame frequency needs to be equal to or greater than a value obtained by the following formula: (Number of Images Switched)×50 Hz.

Patent Document 1: Japanese Unexamined Patent Application Publication No. 63-312788
Patent Document 2: Japanese Unexamined Patent Application Publication No. 2001-255844

DISCLOSURE OF THE INVENTION

Problems to be Solved by the Invention

However, in the invention disclosed in Patent Document 1, a secret image, a reverse image and a public image are sequentially sent out at a high frame rate, thus causing problems that the data rate between the synthesis circuit and image display device is increased and transfer cannot be carried out via the currently dominating digital transmission (such as LVDS, DVI or HDMI). Furthermore, also in the invention disclosed in Patent Document 2, all images are generated by software in a CPU, thus causing the similar problems.

Such a transmission path between an image signal generation section (computer) and a display section (display) is predominantly standardized in general like DVI or HDMI, and in order to carry out transmission with a transmission capacity exceeding this standard, a non-standard operation will be performed or parallelization will be performed. However, transmission of image signals from a computer to a display carried out by performing a non-standard operation or by performing parallelization is not a realistic method.

The present invention has been made in view of the above-described problems, and its object is to provide a display controller and a display apparatus, which are capable of carrying out image display in a high-speed screen switching mode without changing a data rate of a digital transmission path while a signal itself sent through a display transmission path is kept within a standard (60 Hz).

Means for Solving the Problems

To achieve the above object, the present invention provides, as a first aspect thereof, a display controller for sequentially outputting at least two image signals, thereby allowing an image to be displayed on a display in accordance with the image signals, wherein among the image signals to be outputted, an image signal of a first output image and an image signal of a second output image have a relationship that provides an image having no correlation to the first output image when image brightness values of the respective signals are added for each pixel, and wherein a frame frequency when the image signal is outputted is an integral multiple of a frame frequency for an image signal of an input image, the integral multiple being two or more.

Further, to achieve the above object, the present invention provides, as a second aspect thereof, a display controller for sequentially outputting at least two image signals, thereby allowing an image to be displayed on a display in accordance with the image signals, including image generation means for generating, when all output image brightness values including the brightness value of a first output image are added for each pixel, a second output image so that there is provided a second input image that is one of input images and serves as an image to be viewed by an indefinite number of people, and wherein a frame frequency when the image signal is outputted is an integral multiple of a frame frequency for an image signal of an input image, the integral multiple being two or more.

In the first or second aspect of the present invention, the display controller preferably includes light shutter control means for performing control so that a shutter provided between the display and an eye of a user enters a light transmission state at least during a period when the image signal of the first output image is outputted.

In the configuration of either the first or second aspect of the present invention, the display controller preferably includes a receiver for generating the image signal of the input image and a synchronization signal from signals sent from outside via a digital transmission path, the image signal of the input image outputted by the receiver is preferably sent out to an external memory, and the image signal of the input image is preferably read from the memory based on the synchronization signal, thereby generating the image signal to be outputted; in addition, at least part of the signals sent via the digital transmission path further preferably serves as the image signal of the first output image itself.

Furthermore, to achieve the above object, the present invention provides, as a third aspect thereof, a display apparatus for sequentially outputting at least two image signals to display means, thereby allowing an image to be displayed on the display means in accordance with the image signals, wherein among the image signals to be outputted, an image signal of a first output image and an image signal of a second output image have a relationship that provides an image having no correlation to the first output image when image brightness values of the respective signals are added for each pixel, and wherein a frame frequency when the image signal is outputted is an integral multiple of a frame frequency for an image signal of an input image, the integral multiple being two or more.

Moreover, to achieve the above object, the present invention provides, as a fourth aspect thereof, a display apparatus for sequentially outputting at least two image signals to display means, thereby allowing an image to be displayed on the display means in accordance with the image signals, including image generation means for generating, when all output image brightness values including the brightness value of a first output image are added for each pixel, a second output image so that there is provided a second input image that is one of input images and serves as an image to be viewed by an indefinite number of people, and wherein a frame frequency when the image signal is outputted is an integral multiple of a frame frequency for an image signal of an input image, the integral multiple being two or more.

In the third or fourth aspect of the present invention, the display apparatus preferably includes light shutter control means for performing control so that a shutter provided between the display means and an eye of a user enters a light transmission state at least during a period when the image signal of the first output image is outputted.

In the configuration of either the third or fourth aspect of the present invention, the display apparatus preferably includes a receiver for generating the image signal of the input image and a synchronization signal from signals sent from outside via a digital transmission path, the image signal of the input image outputted by the receiver is preferably sent out to an external memory, and the image signal of the input image is preferably read from the memory based on the synchronization signal, thereby generating the image signal to be outputted; in addition, at least part of the signals sent via the digital transmission path more preferably serves as the image signal of the first output image itself.

Effect of the Invention

According to the present invention, it is possible to provide a display controller and a display apparatus, which are capable of carrying out image display in a high-speed screen switching mode without changing a data rate of a digital transmission path while a signal itself sent through a display transmission path is kept within a standard (60 Hz).

BEST MODE FOR CARRYING OUT THE INVENTION

First Exemplary Embodiment

A first exemplary embodiment, in which the present invention is carried out in a preferable manner, will be described. In FIG. 2, there is shown a configuration of a liquid crystal display apparatus according to the present embodiment. This liquid crystal display apparatus includes: a receiver 121; a memory 101; a reverse image generation circuit 104; a display controller 102; a shutter eyeglass control signal generation circuit 103; and a liquid crystal display section 105.

The receiver 121 separates a signal, sent out from a video source through a transmission path 110 standardized in accordance with an image transmission standard (such as LVDS, DVI or HDMI), into an image signal and a synchronization signal. The memory 101 accumulates, as a secret image, image signals outputted from the receiver 121 and sequentially inputted to the memory, and also accumulates a public image preset in addition to the sequential inputs. The reverse image generation circuit 104 generates a reverse image based on the secret image inputted from the memory 101, and outputs the reveres image. The display controller 102 allocates data so that the secret image and public image sequentially outputted from the memory 101 based on the synchronization signal, and the reverse image outputted from the reverse image generation circuit 104 can be displayed on the liquid crystal display section 105, and generates a control signal for driving the liquid crystal display section 105, and an image signal. The shutter eyeglass control signal generation circuit 103 controls a light transmission state and a light shielding state of a shutter eyeglass based on the inputted synchronization signal.

In this embodiment, output signals from the memory 101 and the reverse image generation circuit 104, an output signal from the display controller 102, and an output signal from the shutter eyeglass control signal generation circuit 103 are denoted by the reference characters 111, 112, and 113, respectively.

The display controller 102 outputs, to the liquid crystal display section 105, the image signals sequentially outputted by allocating data of any one of the secret image, reverse image and public image for each period, and the control signal for driving the liquid crystal display section 105.

In FIG. 3, there is shown a configuration of the liquid crystal display section 105. The liquid crystal display section 105 at least includes: a plurality of scanning lines 31 and a plurality of signal lines 32 intersecting each other; a scanning line driver 33 for controlling signals inputted to the plurality of scanning lines 31; a signal line driver 34 for controlling signals inputted to the plurality of signal lines 32; a plurality of pixels 35 provided in a matrix at respective intersections via thin-film transistors (TFTs); and auxiliary capacitors 36 connected in parallel. In the pixels 35, regions which actually display an image, are collectively defined as an effective display region 38.

In FIG. 4, there is shown an example of a timing chart during a single frame period for the output signals 111, 112 and 113. Based on this timing chart, processes carried out by the display controller 102 will be described. In this example, description is made about a configuration in which a single frame is divided into six sub-frames, a secret image is displayed in two sub-frames, a reverse image is displayed in two sub-frames, and a public image is displayed in two sub-frames; however, the number of sub-frames and allocation to each image can be freely set as long as an image having no correlation to the secret image is provided when a brightness-synthesizing computation is performed for secret image display and revere image display.

The display controller 102 is fed a secret image, a reverse image and a public image, performs data allocation for the secret image during periods Ton1 and Ton2, and performs data allocation for the reverse image and public image during periods Toff1 and Toff2. It is noted that a secret image S and a reverse image R become an image having no correlation to the secret image when the images are synthesized by performing, for each pixel, the computation of S+R.

In the period Ton1, first, a grayscale value of the image S, which is the secret image, is outputted to the liquid crystal display section 105 for each pixel of a screen during a data write period W. Then, a light transmission state or a light shielding state is maintained until the next write period W.

Next, also during the period Toff1, data allocation for the reverse image R and public image P is carried out by performing processes similar to those performed on the secret image (writing process and light transmission state maintaining process), and the grayscale of each image is reproduced.

The output signal 113 sent to the shutter eyeglass serves as a signal for putting the shutter eyeglass in a light transmission state during the periods Ton, and for putting the shutter eyeglass in a light shielding state during the periods Toff. The output signal 113 is generated by the shutter eyeglass control signal generation circuit 103 based on a video synchronization signal.

It is noted that the display controller 102 generates the secret image S, the reverse image R and the public image P during a single frame period, but these images may be generated basically in any order in principle. For example, as shown in FIG. 5, even if the output period of the reverse image R and that of the public image P are exchanged with respect to the timing chart of FIG. 4, no difference is made in the images perceived by both of a person wearing the shutter eyeglass and a person wearing no shutter eyeglass. Similarly, as long as the output signal 113 of the shutter eyeglass control signal generation circuit 103 is generated so that the shutter eyeglass enters a light transmission state during the display period of the secret image S, the secret image, reverse image and public image may be generated in any order.

What becomes important in this case is a method of generating the reverse image R in the reverse image generation circuit 104. The reverse image R is generated so that an image having no correlation to the secret image is provided when images are synthesized by performing, for each pixel, the brightness computation of S+R. This is because on a retina, not the grayscale but the brightness is integrated and perceived. At this time, since an input signal is a grayscale value, the value is converted into a brightness value when a reverse image is generated, and furthermore, an output signal after the brightness computation is returned to the grayscale value. Therefore, it is necessary to know γ characteristics (grayscale-brightness characteristics) of the liquid crystal display section 105 in advance. Further, the γ characteristics of the liquid crystal display section 105 differ from each other, and also differ depending on an ambient environment such as temperature; therefore, the reverse image generation circuit 104 is preferably provided inside the display apparatus to generate a reverse image appropriately.

Furthermore, the presetting of the public image in the memory 101 eliminates the necessity for constant transmission thereof from the vide source, and only the secret image is sequentially transmitted at 60 Hz from the video source. By providing the reverse image generation circuit 104, the memory 101 for accumulating the public image, and the display controller 102 for performing image switching display at a frequency higher than the frame frequency specified in the transmission path as described above, it is possible to realize the liquid crystal display apparatus capable of displaying the secret image in a manner that is difficult for a person without the shutter eyeglass to view the secret image, without making any change to the specifications of the transmission path and by only sending out a video signal in a format similar to that of a normal image from the video source.

It is noted that although the apparatus is formed by providing the display controller 102 and the reverse image generation circuit 104 as different blocks in the present embodiment, the functions of the reverse image generation circuit 104 may be included in the display controller 102. Moreover, the functions of the shutter eyeglass control signal generation circuit 103 and/or the receiver 121 may naturally be included in the display controller 102. When the functions of the receiver 121 are included in the display controller 102, a memory 101' is connected so as to exchange data with a display controller 102' as shown in FIG. 6.

Second Exemplary Embodiment

A second exemplary embodiment, in which the present invention is carried out in a preferable manner, will be described. The liquid crystal display apparatus according to the present embodiment has a configuration substantially similar to that of the liquid crystal display apparatus according to the first exemplary embodiment, but differs from the first exemplary embodiment in that a secret image and a public image are sent from a video source to the liquid crystal display apparatus at an optional ratio via a transmission path.

In FIG. 7, there is shown the configuration of the liquid crystal display apparatus according to the present embodiment. The position of writing of an image, outputted from a receiver 121, to a memory 101A is different between the secret image and public image. Further, unlike the first exemplary embodiment, no public image is preset in the memory 101A, and a selected one of images outputted from the receiver 121 is written as the public image to the memory 101A, thereby updating the public image as appropriate.

In this embodiment, as for the transmission ratio between the secret image and public image, the public image may be transmitted for each constant period such as 60 frames, or the transmission ratio may be changed as appropriate in accordance with the importance of the public image. If importance is placed only on the display of the secret image, the moving-image display of the secret image for 60 frames can be realized by transmitting the public image only at the start of display of the secret image. On the other hand, if similar importance is placed on the secret image and public image, the secret image and public image may be transmitted alternately (i.e., the secret image and public image are each transmitted for 30 frames per second). In the display apparatus, each image needs to be displayed at 60 frames per second; therefore, in this case, the frame rate is converted to 60 frames per second by outputting the same secret image and public image twice in a row from the memory 101A, but if the main display image is a still image, image quality degradation or the like will not occur even if the frame rate is increased by outputting the same image twice.

Thus, it is possible to realize the liquid crystal display apparatus capable of not only achieving the effects similar to those of the first exemplary embodiment, but also changing the public image as appropriate by using, as the public image, part of images transmitted through the standardized transmission path.

Third Exemplary Embodiment

A third exemplary embodiment, in which the present invention is carried out in a preferable manner, will be described. In FIG. 8, there is shown a configuration of a liquid crystal display apparatus according to the present embodiment. This liquid crystal display apparatus is substantially similar to the liquid crystal display apparatus according to the first exemplary embodiment, but differs from the liquid crystal display apparatus according to the first exemplary embodiment in that no reverse image generation circuit is provided, and a secret image, a reverse image and a public image are sent from a video source at an optional ratio via a transmission path.

Images outputted from the receiver 121 are accumulated as the secret image, reverse image and public image in a memory 101B. Unlike the first exemplary embodiment, no public image is preset in the memory 101B, and a selected one of the images outputted from the receiver 121 is written as the public image to the memory 101B, thereby updating the public image as appropriate.

In this embodiment, as for the transmission ratios of the secret image, reverse image and public image, the ratio of the secret image is preferably similar to that of the reverse image.

This is because the reverse image, which pairs up with the secret image, is necessary for each secret image in order to constantly cancel out the secret image. The ratio between the secret image and public image is similar to that of the second exemplary embodiment.

The other operations are similar to those of the first exemplary embodiment, and therefore, redundant description will be omitted.

Even if no reverse image generation circuit is provided, by providing the display controller for performing image switching display at a frequency higher than the frame frequency specified in the transmission path as described above, it is possible to realize the liquid crystal display apparatus capable of displaying the secret image in a manner that is difficult for a person without the shutter eyeglass to view the secret image, without making any change to the specifications of the transmission path, although this liquid crystal display apparatus is inferior in moving image smoothness to the liquid crystal display apparatuses according to the first exemplary embodiment and the second exemplary embodiment.

FIG. 9 is a diagram showing transmission path frame frequencies when a video signal, sent out at a standard frame frequency via a digital transmission path, is displayed on the liquid crystal display section 105 in the first to third exemplary embodiments. Configurations (1), (2) and (3) at the left-hand part of the diagram correspond to the third exemplary embodiment, the first exemplary embodiment, and the second exemplary embodiment, respectively.

For example, in the configuration (1), the secret image, reverse image and public image are transmitted 20 times for one second at 60 Hz in total, and the same image is displayed three times on the liquid crystal display section 105 at a three-fold frame frequency of 180 Hz via a frame frequency conversion circuit, thereby making it possible to realize the liquid crystal display apparatus that displays an image in a high-speed image switching mode while sending out the image within the standard of the digital transmission path. Further, other methods include the configuration (2) in which only the secret image is transmitted at 60 Hz, and the reverse image generation circuit is further provided in the frame frequency conversion circuit, thereby realizing high-speed switching of the secret image and reverse image. The conceivable configurations further include the configuration (3) in which the secret image and public image are transmitted 30 times for one second at 60 Hz in total, and the reverse image generation circuit similar to that of the configuration (2) is utilized, thereby realizing high-speed switching of the secret image, reverse image and public image.

On the other hand, in the related technique, a video signal is transmitted at a frequency of 180 Hz that is higher than a frame frequency specified in a transmission path, and therefore, configuration change such as parallelization is absolutely necessary.

Fourth Exemplary Embodiment

A fourth exemplary embodiment, in which the present invention is carried out in a preferable manner, will be described. In FIG. 10, there is shown a configuration of a display apparatus according to the present embodiment. This display apparatus is substantially similar to the liquid crystal display apparatus according to the first exemplary embodiment, but differs therefrom in that a display section 106 is provided instead of the liquid crystal display section 105 in the first exemplary embodiment, and pulse width modulation (PWM) driving is utilized as a driving method thereof. The display section 106 is not particularly limited as long as a PWM driving method is utilized, and examples of the display section include: a plasma display; a display that uses a MEMS switch; and an organic electroluminescence display. Since PWM driving is carried out in this embodiment, a display controller is operated differently from the first exemplary embodiment. Furthermore, an output signal of a display controller 102A is denoted by the reference character 112A. As for other points, the fourth exemplary embodiment is similar to the first exemplary embodiment.

In FIG. 11, there is shown an example of a timing chart of a single frame period for output signals 111, 112A and 113. The secret image, reverse image and public image accumulated in a memory 101 are sent to the display controller 102A. In the display controller 102A, the data of the secret image is allocated during a period T1, and the data of the reverse image and public image is allocated during a period T2.

During the period T1, first, a notification that each pixel of a screen is in a luminescent/light transmission state (On state) or in a non-luminescent/light shielding state (Off state) is provided to the display section 106 during a data write period W. Then, during a period S2, the pixel luminescence (in the case of a self-luminous display such as a plasma display or an organic electroluminescence display), the light transmission state (in the case of a light-controlled display such as a display that uses a MEMS switch), or the non-luminescent/light shielding state is maintained. Thereafter, data writing is carried out again, and the On/Off state of the pixel is maintained during a period S1, the length of which is different from that of the period S2. The grayscale of the secret image is reproduced by a combination of the On/Off states of the periods S2 and S1.

Next, also in the period T2, the data of the reverse image and public image is allocated by performing processes similar to those performed to generate the secret image (writing process and luminescent/light transmission state maintaining process), and the grayscale of each image is reproduced. The grayscale of the reverse image is reproduced using On/Off state maintaining periods R2 and R1, the lengths of which are similar to those of the periods S2 and S1, respectively. In this case, for a certain pixel, there is established the following relationship: if the period S2 brings about an On state, the period R2 brings about an Off state, and if the period S2 brings about an Off state, the period R2 brings about an On state. The periods S1 and R1 also have the similar relationship. The grayscale of the public image is reproduced using periods P4, P3, P2 and P1.

The output signal 113 sent to a shutter eyeglass serves as a signal for putting the shutter eyeglass in a light transmission state during the period T1, and for putting the shutter eyeglass in a light shielding state during the period T2. This signal is generated by a shutter eyeglass control signal generation circuit 103 based on a video synchronization signal.

It is noted that the display controller 102A generates the secret image S, the reverse image R and the public image P in this order during a single frame period, but these images may be generated basically in any order in principle.

For example, as shown in FIG. 12, even if the periods R2 and P2 are exchanged with respect to the timing chart of FIG. 11, no difference is made in the images perceived by both of a person wearing the shutter eyeglass and a person wearing no shutter eyeglass. Similarly, as long as the output signal 113 of the shutter eyeglass control signal generation circuit 103 is generated so that the shutter eyeglass enters a light transmission state during the display period of the secret image S, the secret image, reverse image and public image may be generated basically in any order.

As described above, the effects similar to those of the first exemplary embodiment are obtainable not only in liquid crystal display apparatuses but also in other display apparatuses. Moreover, the effects similar to those of the second exemplary embodiment and the third exemplary embodiment can also naturally be obtained in the same manner.

It is noted that each of the foregoing embodiments is an example of a preferred embodiment of the present invention, and the present invention is not limited thereto.

For example, in each of the foregoing embodiments, no particular description is made about each of RGB signals, but the processes similar to those performed in the foregoing embodiment are performed on each signal component, thereby making it possible to obtain the similar effects also for a color image.

Further, a raster image does not necessarily have to be a color image including image signals of a plurality of colors, but may be a monochromatic image. In other words, the configuration described in each of the foregoing embodiments does not necessarily have to be provided in parallel for respective colors.

Furthermore, although the description has been made about the configuration in which the shutter eyeglass is used to perceive the secret image, the shutter does not necessarily have to be in the form of an eyeglass as long as it can be provided between the display section and the eye of a user.

Thus, various modifications can be made to the present invention.

BRIEF DESCRIPTION OF THE DRAWINGS

FIG. 11 is a diagram showing a timing chart for each control signal of the display apparatus according to the fourth exemplary embodiment.

FIG. 12 is a diagram showing another example of a timing chart for each control signal of the display apparatus according to the fourth exemplary embodiment.

DESCRIPTION OF THE REFERENCE CHARACTERS

Figure 1:
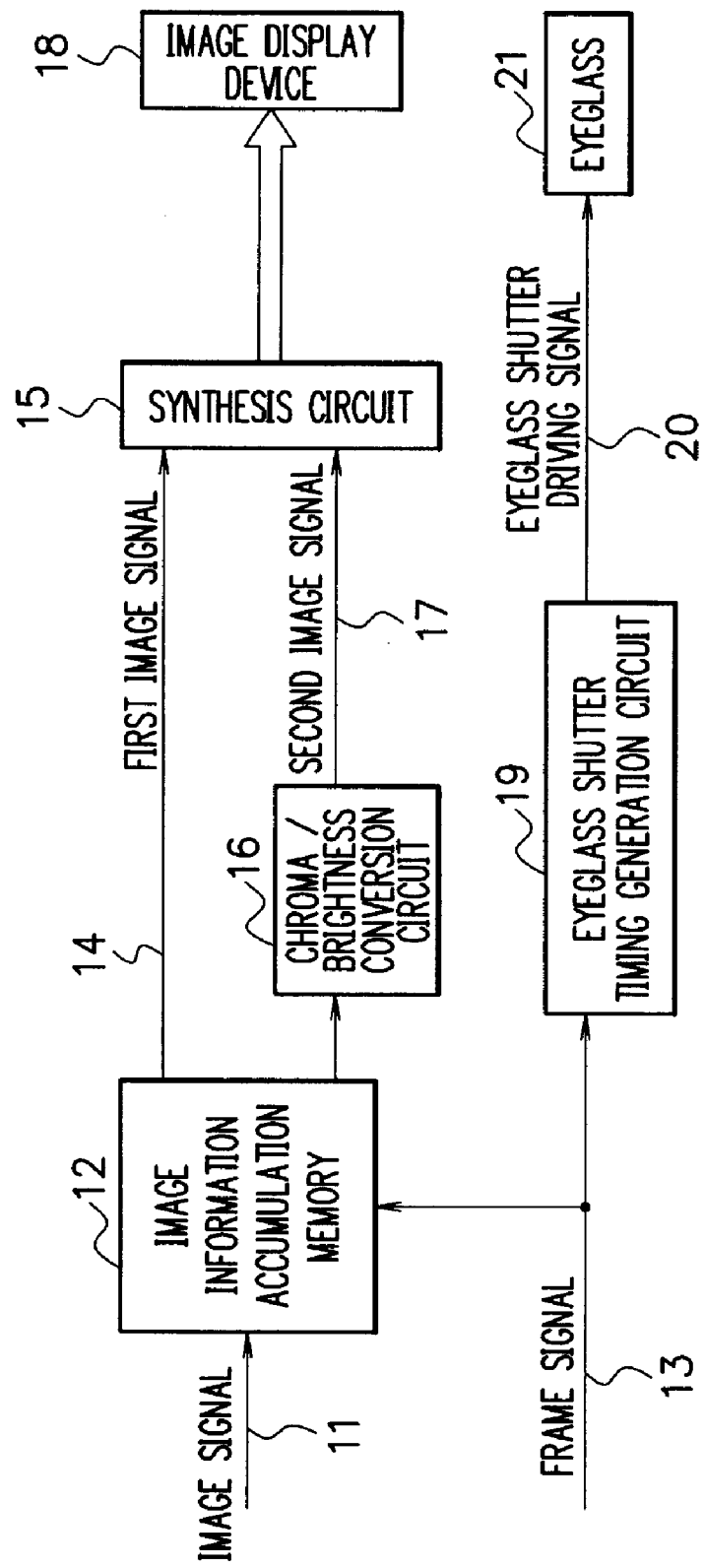
FIG. 1 is a diagram showing a configuration of an image display apparatus according to a related technique.
Figure 2:
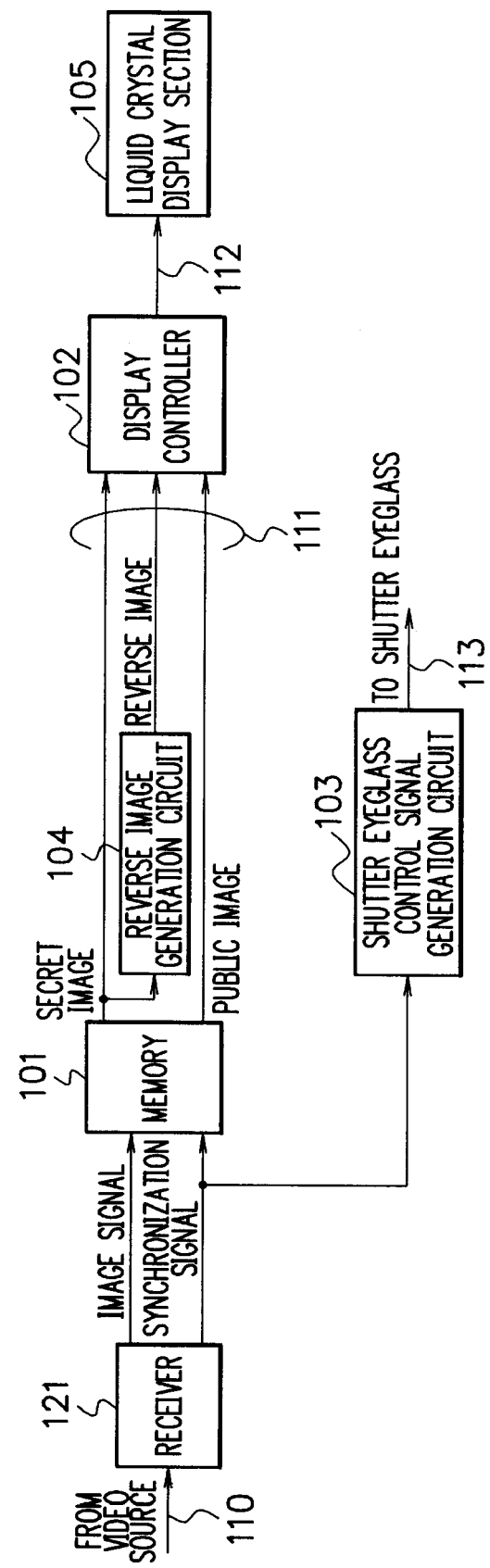
FIG. 2 is a diagram showing a configuration of a liquid crystal display apparatus according to a first exemplary embodiment in which the present invention is carried out in a preferable manner.
Figure 3:
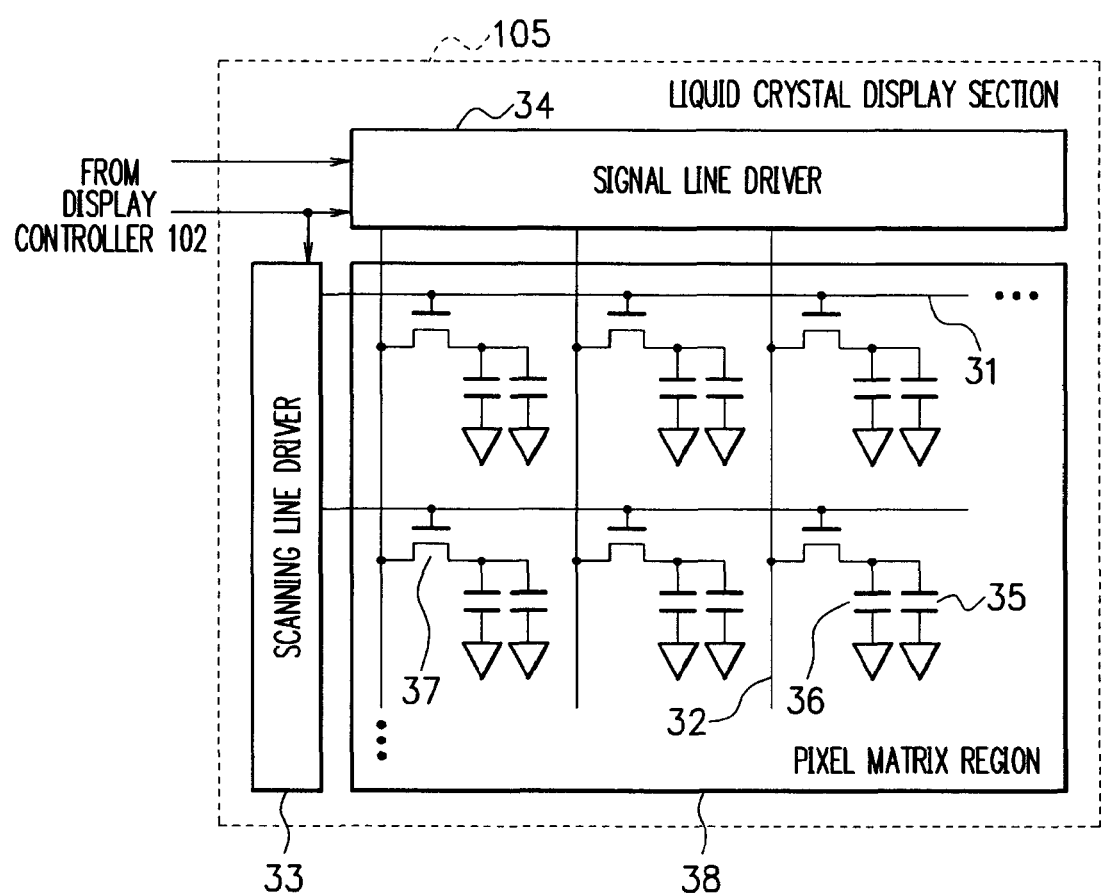
FIG. 3 is a diagram showing a configuration of a liquid crystal display section according to the first exemplary embodiment.
Figure 4:
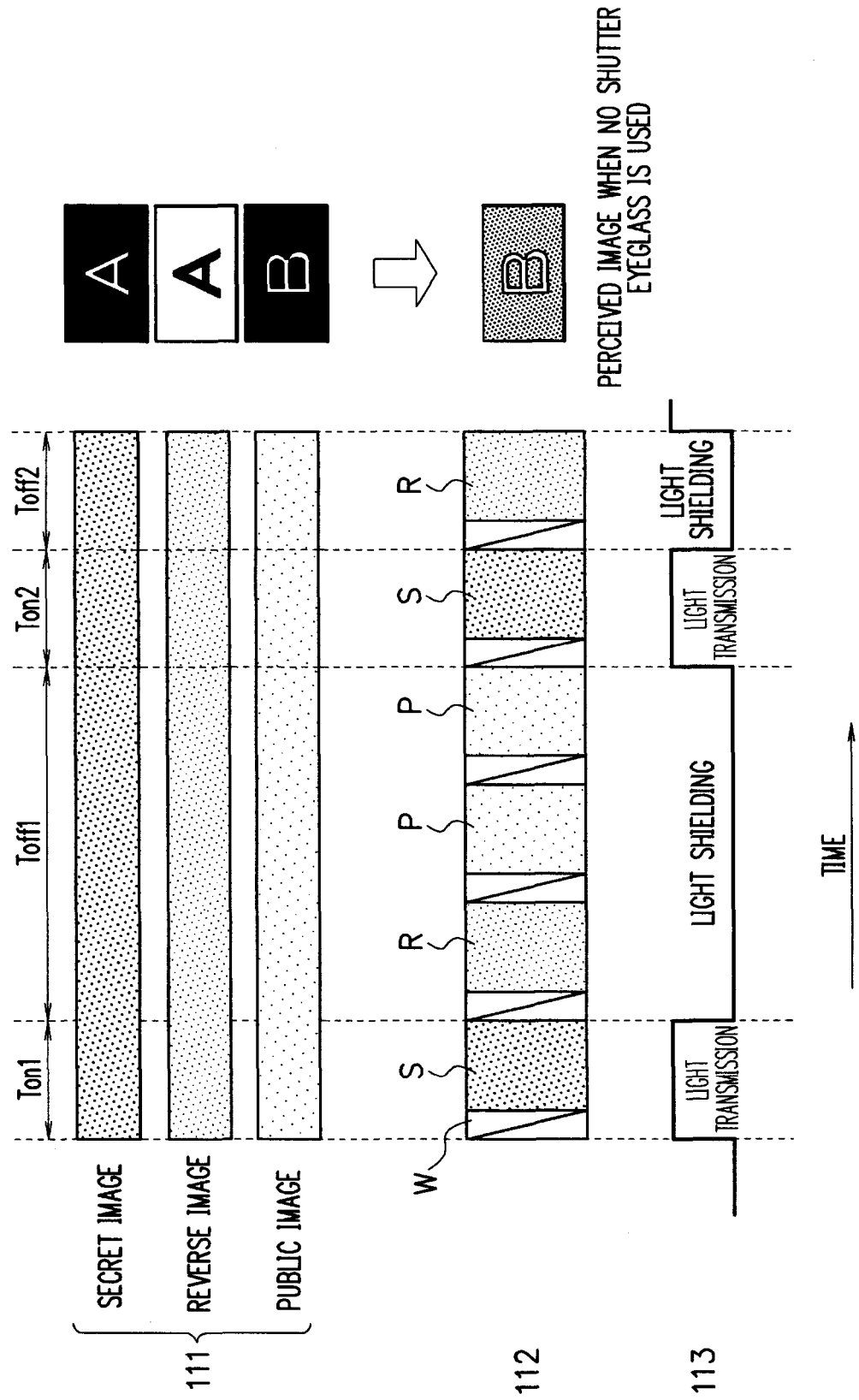
FIG. 4 is a diagram showing an example of a timing chart for each control signal of the liquid crystal display apparatus according to the first exemplary embodiment.
Figure 5:
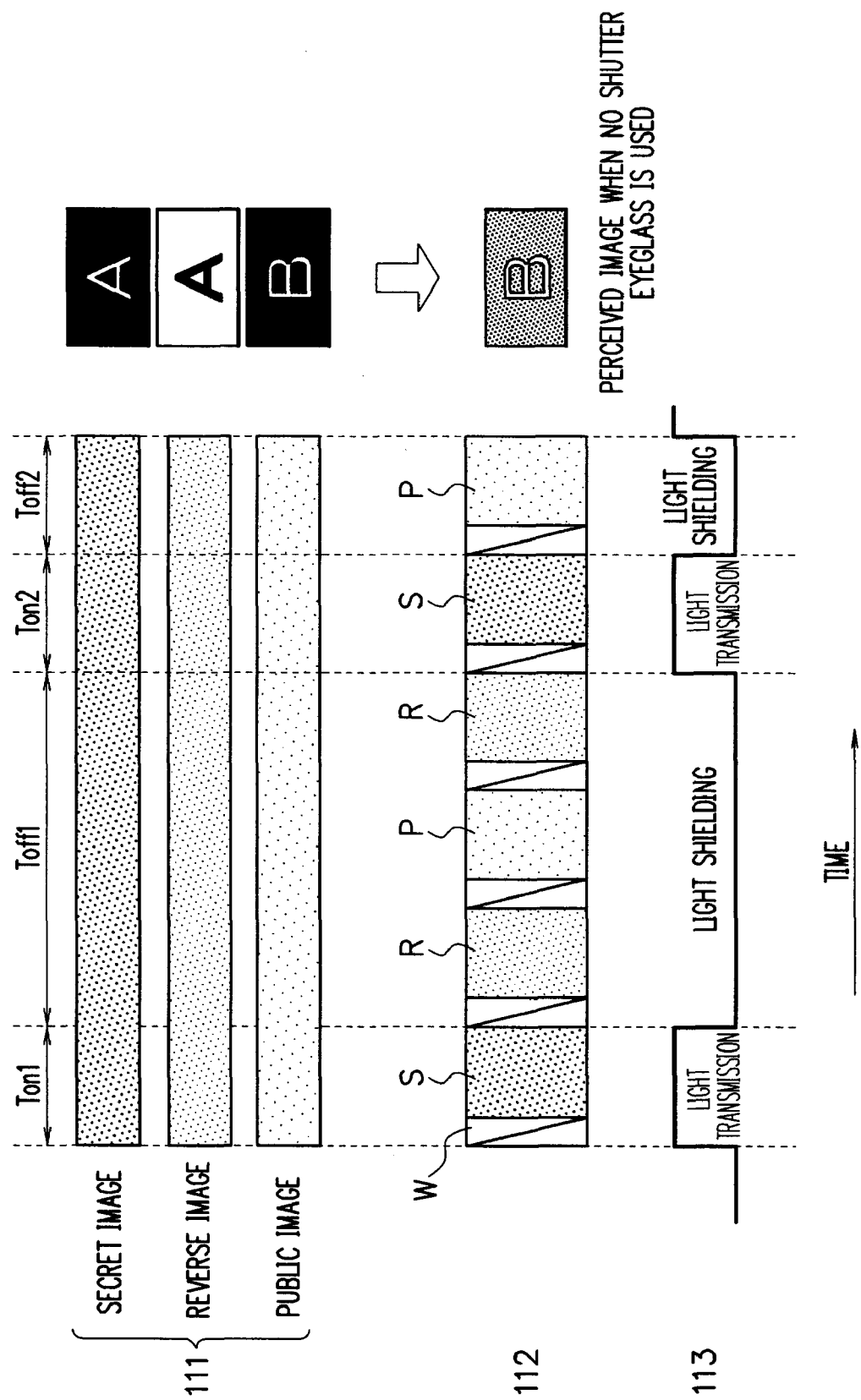
FIG. 5 is a diagram showing another example of a timing chart for each control signal of the liquid crystal display apparatus according to the first exemplary embodiment.
Figure 6:
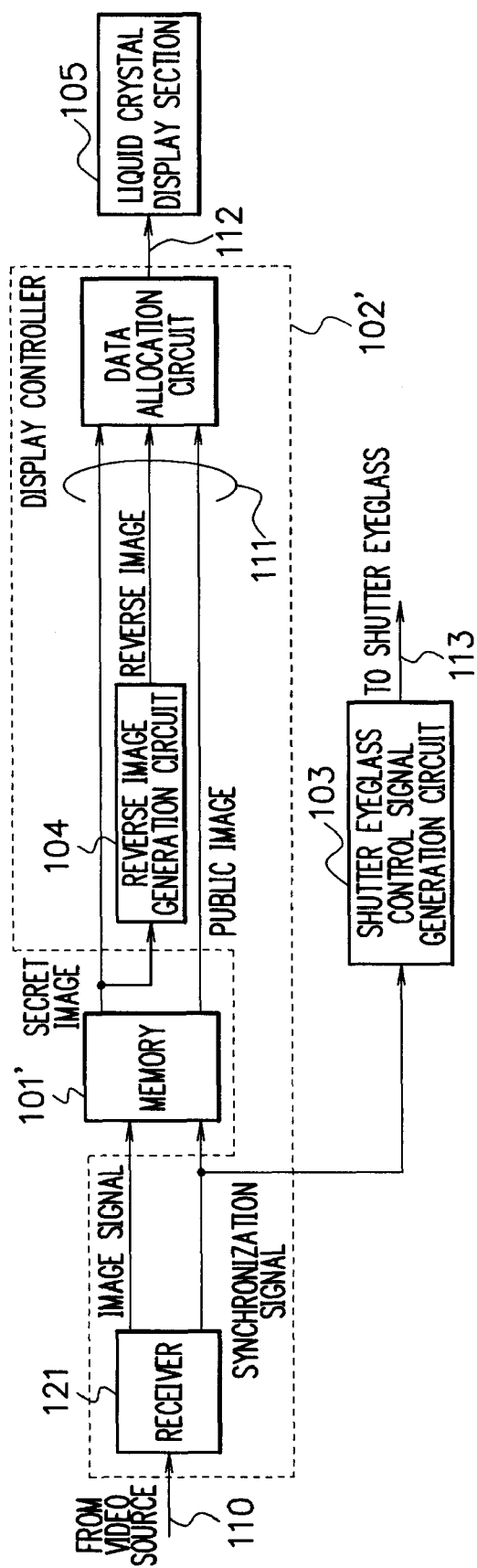
FIG. 6 is a diagram showing another configuration of the liquid crystal display apparatus according to the first exemplary embodiment.
Figure 7:
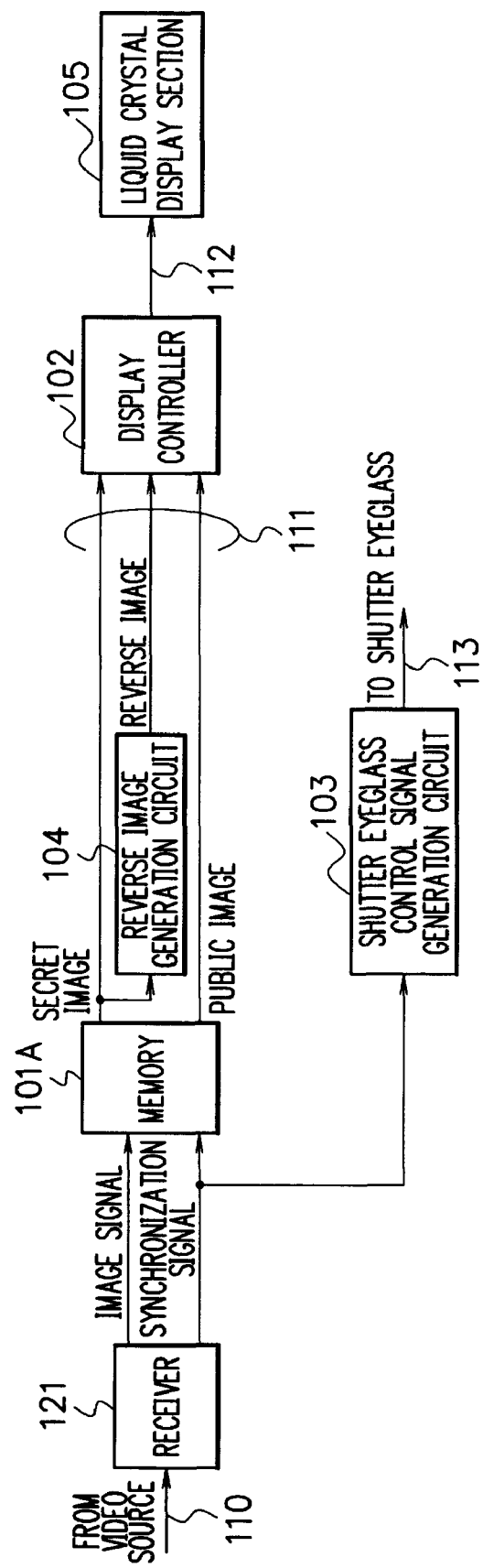
FIG. 7 is a diagram showing a configuration of a liquid crystal display apparatus according to a second exemplary embodiment in which the present invention is carried out in a preferable manner.
Figure 8:
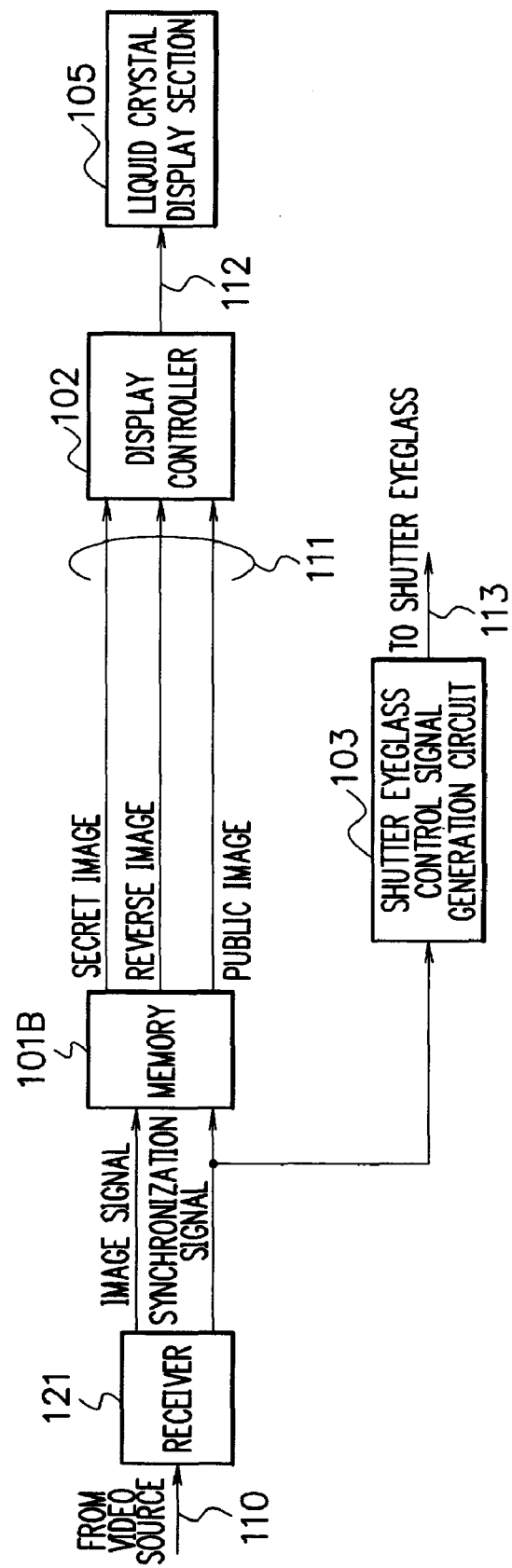
FIG. 8 is a diagram showing a configuration of a liquid crystal display apparatus according to a third exemplary embodiment in which the present invention is carried out in a preferable manner.
Figure 9:
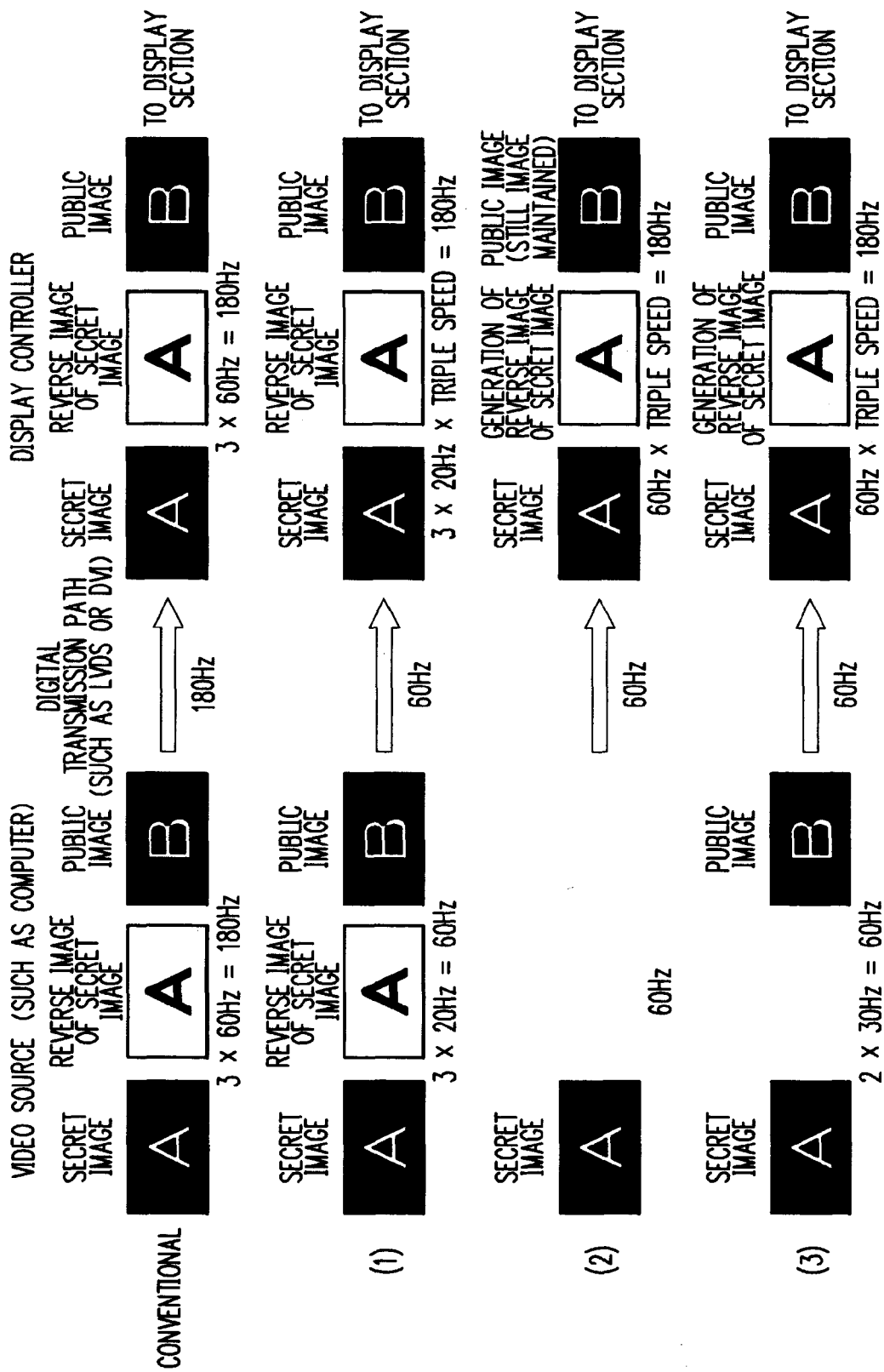
FIG. 9 is a diagram showing configurations for images transmitted from an image source and frame frequencies thereof.
Figure 10:
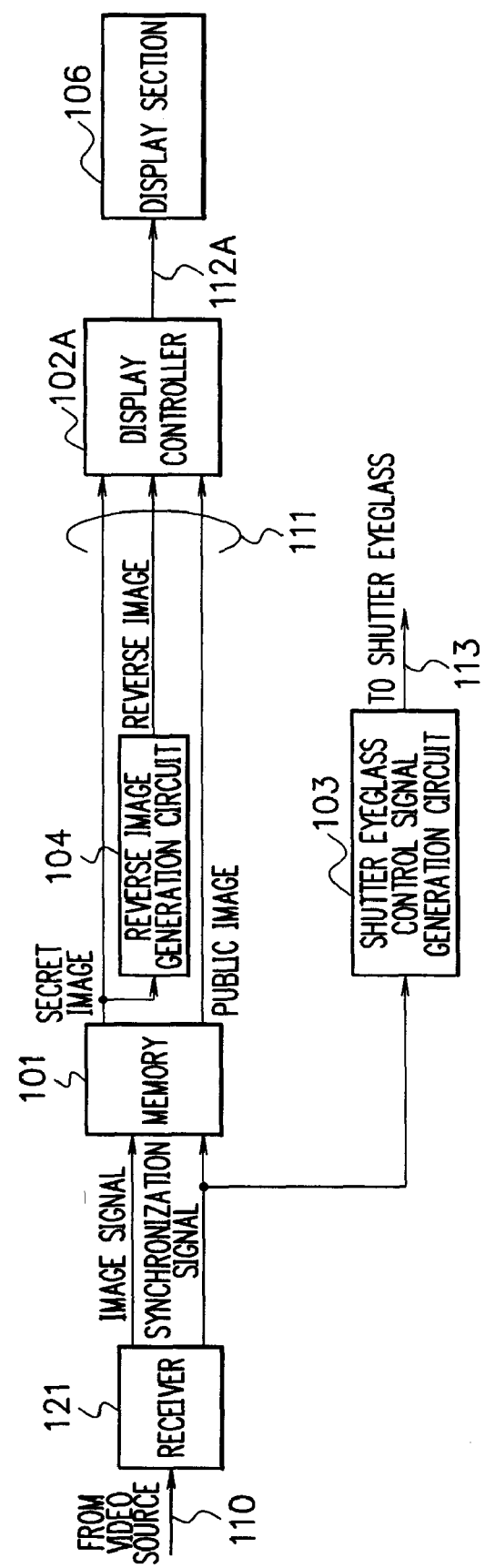
FIG. 10 is a diagram showing a configuration of a display apparatus according to a fourth exemplary embodiment in which the present invention is carried out in a preferable manner.

- 31 scanning line
- 32 signal line
- 33 scanning line driver
- 34 signal line driver
- 35 pixel
- 36 auxiliary capacitor
- 37 thin-film transistor (TFT)
- 38 effective display region
- 101, 101', 101A, 101B memory
- 102, 102', 102A display controller
- 103 shutter eyeglass control signal generation circuit
- 104 reverse image generation circuit
- 105 liquid crystal display section
- 106 display section
- 110 transmission path
- 111 output signal (from memory)
- 112, 112' output signal (from display controller)
- 113 output signal (from shutter eyeglass control signal generation circuit)
- 121 receiver

What is claimed is:

1. A display system comprising:
   a display unit; and
   a controller for sequentially outputting at least two image signals based on at least two input image signals sent via a single digital transmission path, thereby allowing an image to be displayed on the display unit in accordance with the image signals,
   wherein among the image signals to be outputted, an image signal of a first output image and an image signal of a second output image have a relationship that provides an image having no correlation to the first output image when image brightness values of the respective signals are added for each pixel,
   wherein a frame frequency when the image signal is outputted is an integral multiple of a frame frequency for the image signal of the input image, the integral multiple being two or more,
   wherein the display unit displays the image in accordance with the image signals at a frame frequency of an integral multiple of a frame frequency for the image signal of the input image,
   wherein image display is provided within a high-speed screen switching mode without changing a data rate of the single digital transmission path while a signal sent through the single digital transmission path is kept within a predetermined standard,
   and wherein image switching is performed at a frequency higher than a frame frequency of the single digital transmission path.

2. A display system comprising:
   a display unit; and
   a display controller for sequentially outputting at least two image signals based on at least two input image signals sent via a single digital transmission path, thereby allowing an image to be displayed on the display unit in accordance with the image signals, comprising:
   an image generation unit that generates, when all output image brightness values including the brightness value of a first output image are added for each pixel, a second output image so that there is provided a second input image that is one of input images and serves as an image to be viewed by an indefinite number of people,
   wherein a frame frequency when the image signal is outputted is an integral multiple of a frame frequency for the image signal of the input image, the integral multiple being two or more,
   wherein the display unit displays the image in accordance with the image signals at a frame frequency of an integral multiple of a frame frequency for the image signal of the input image,
   wherein image display is provided within a high-speed screen switching mode without changing a data rate of the single digital transmission path while a signal sent through the single digital transmission path is kept within a predetermined standard,
   and wherein image switching is performed at a frequency higher than a frame frequency of the single digital transmission path.

3. The display system according to claim 2,
   wherein among the image signals to be outputted, an image signal of the first output image and an image signal of the second output image have a relationship that provides an image having no correlation to the first output image when image brightness values of the respective signals are added for each pixel.

4. The display system according to claim 1,
   wherein the display controller comprises a light shutter control unit that performs control so that a shutter provided between the display and an eye of a user enters a light transmission state at least during a period when the image signal of the first output image is outputted.

5. The display system according to claim 1,
   wherein the display controller comprises a receiver for generating the image signal of the input image and a synchronization signal from signals sent from outside via the digital transmission path,
   wherein the image signal of the input image outputted by the receiver is sent out to an external memory, and
   wherein the image signal of the input image is read from the memory based on the synchronization signal, thereby generating the image signal to be outputted.

6. The display system according to claim 5,
   wherein at least part of the signals sent via the digital transmission path serves as the image signal of the first output image itself.

7. A display apparatus for sequentially outputting at least two image signals to a display unit based on at least two input image signals sent via a single digital transmission path, thereby allowing an image to be displayed on the display unit in accordance with the image signals,
   wherein among the image signals to be outputted, an image signal of a first output image and an image signal of a second output image have a relationship that provides an image having no correlation to the first output image when image brightness values of the respective signals are added for each pixel,
   wherein a frame frequency when the image signal is outputted is an integral multiple of a frame frequency for the image signal of the input image, the integral multiple being two or more,
   wherein the display unit displays the image in accordance with the image signals at a frame frequency of an integral multiple of a frame frequency for the image signal of the input image,
   wherein image display is provided within a high-speed screen switching mode without changing a data rate of the single digital transmission path while a signal sent through the single digital transmission path is kept within a predetermined standard,
and wherein image switching is performed at a frequency higher than a frame frequency of the single digital transmission path.

8. A display apparatus for sequentially outputting at least two image signals to a display unit based on at least two input image signals sent via a single digital transmission path, thereby allowing an image to be displayed on the display unit in accordance with the image signals, comprising:
an image generation unit that generates, when all output image brightness values including the brightness value of a first output image are added for each pixel, a second output image so that there is provided a second input image that is one of input images and serves as an image to be viewed by an indefinite number of people,
wherein a frame frequency when the image signal is outputted is an integral multiple of a frame frequency for the image signal of the input image, the integral multiple being two or more,
wherein the display unit displays the image in accordance with the image signals at a frame frequency of an integral multiple of a frame frequency for the image signal of the input image,
wherein image display is provided within a high-speed screen switching mode without changing a data rate of the single digital transmission path while a signal sent through the single digital transmission path is kept within a predetermined standard,
and wherein image switching is performed at a frequency higher than a frame frequency of the single digital transmission path.

9. The display apparatus according to claim 8,
wherein among the image signals to be outputted, an image signal of the first output image and an image signal of the second output image have a relationship that provides an image having no correlation to the first output image when image brightness values of the respective signals are added for each pixel.

10. The display apparatus according to claim 7,
wherein the display apparatus comprises a light shutter control unit that performs control so that a shutter provided between the display unit and an eye of a user enters a light transmission state at least during a period when the image signal of the first output image is outputted.

11. The display apparatus according to claim 7,
wherein the display apparatus comprises a receiver for generating the image signal of the input image and a synchronization signal from signals sent from outside via the digital transmission path,
wherein the image signal of the input image outputted by the receiver is sent out to an external memory, and
wherein the image signal of the input image is read from the memory based on the synchronization signal, thereby generating the image signal to be outputted.

12. The display apparatus according to claim 11,
wherein at least part of the signals sent via the digital transmission path serves as the image signal of the first output image itself.

13. A display controller comprising:
a video signal receiving unit that receives, as input images, a video signal including at least an image signal of a first output image at a frequency which is in conformity with a standard of a digital transmission path; and
a unit that generates a second output image having no correlation to the first output image when image brightness values of the first output image are added to those of the second output image for each pixel based on the image signal of the first output image,
wherein, the display controller sequentially outputs the image signals of the first output image, the second output image and a third output image that serves as an image to be viewed by an indefinite number of people, at a frame frequency that is an integral multiple of a frame frequency for an image signal of the input image, the integral multiple being two or more, and thereby allows an image to be displayed on a display unit in accordance with the image signals,
wherein the display unit displays the image in accordance with the image signals at a frame frequency of an integral multiple of a frame frequency for the image signal of the input image,
wherein image display is provided within a high-speed screen switching mode without changing a data rate of the single digital transmission path while a signal sent through the single digital transmission path is kept within a predetermined standard,
and wherein image switching is performed at a frequency higher than a frame frequency of the single digital transmission path.

14. The display controller according to claim 13,
wherein the display controller acquires data of the third output image stored in a data storage unit provided outside, and outputs the image signal of the third output image.

15. A display apparatus comprising:
a video signal receiving unit that receives, as input images, a video signal including at least an image signal of a first output image at a frequency which is in conformity with a standard of a digital transmission path;
a unit that generates a second output image having no correlation to the first output image when image brightness values of the first output image are added to those of the second output image for each pixel based on the image signal of the first output image; and
a display controller that sequentially outputs the image signals of the first output image, the second output image and a third output image that serves as an image to be viewed by an indefinite number of people, at a frame frequency that is an integral multiple of a frame frequency for an image signal of the input image, the integral multiple being two or more, and thereby allows an image to be displayed on a display unit in accordance with the image signals,
wherein the display unit displays the image in accordance with the image signals at a frame frequency of an integral multiple of a frame frequency for the image signal of the input image,
wherein image display is provided within a high-speed screen switching mode without changing a data rate of the single digital transmission path while a signal sent through the single digital transmission path is kept within a redetermined standard
and wherein image switching is performed at a frequency higher than a frame frequency of the single digital transmission path.

16. The display apparatus according to claim 15, further comprising:
a data storage unit that stores data of the third output image,
wherein the display apparatus outputs the image signal of the third output image, read from the data in the data storage unit.

17. A display system comprising:
a video signal output apparatus that outputs a video signal including at least an image signal of a first image at a frequency which is in conformity with a standard of a digital transmission path; and
a display apparatus including a receiver, a display controller that generates a second output image having no correlation to the first output image when image brightness values of the first output image are added to those of the second output image for each pixel based on the image signal of the first output image included in the video signal input via the transmission path, and a display unit that displays an image in accordance with the image signals,
wherein, the display apparatus outputs the image signals of the first output image, the second output image and a third output image that serves as an image to be viewed by an indefinite number of people, at a frame frequency that is an integral multiple of a frame frequency for an image signal of the input image, the integral multiple being two or more, and thereby allows an image to be displayed on the display unit in accordance with the image signals,
wherein the display unit displays the image in accordance with the image signals at a frame frequency of an integral multiple of a frame frequency for the image signal of the input image,
wherein image display is provided within a high-speed screen switching mode without changing a data rate of the single digital transmission path while a signal sent through the single digital transmission path is kept within a predetermined standard,
and wherein image switching is performed at a frequency higher than a frame frequency of the single digital transmission path.

18. The display system according to claim 17, further comprising:
a data storage unit that stores data of the third output image,
wherein the display apparatus outputs the image signal of the third output image, read from the data in the data storage unit.

19. The display system according to claim 2,
wherein the display controller comprises a light shutter control unit that performs control so that a shutter provided between the display and an eye of a user enters a light transmission state at least during a period when the image signal of the first output image is outputted.

20. The display system according to claim 2,
wherein the display controller comprises a receiver for generating the image signal of the input image and a synchronization signal from signals sent from outside via the digital transmission path,
wherein the image signal of the input image outputted by the receiver is sent out to an external memory, and
wherein the image signal of the input image is read from the memory based on the synchronization signal, thereby generating the image signal to be outputted.

21. The display controller according to claim 13,
wherein the display controller comprises a light shutter control unit that performs control so that a shutter provided between the display and an eye of a user enters a light transmission state at least during a period when the image signal of the first output image is outputted.

22. The display controller according to claim 13,
wherein the display controller comprises a receiver for generating the image signal of the input image and a synchronization signal from signals sent from outside via the digital transmission path,
wherein the image signal of the input image outputted by the receiver is sent out to an external memory, and
wherein the image signal of the input image is read from the memory based on the synchronization signal, thereby generating the image signal to be outputted.

23. The display apparatus according to claim 8,
wherein the display apparatus comprises a light shutter control unit that performs control so that a shutter provided between the display unit and an eye of a user enters a light transmission state at least during a period when the image signal of the first output image is outputted.

24. The display apparatus according to claim 8,
wherein the display apparatus comprises a receiver for generating the image signal of the input image and a synchronization signal from signals sent from outside via the digital transmission path,
wherein the image signal of the input image outputted by the receiver is sent out to an external memory, and
wherein the image signal of the input image is read from the memory based on the synchronization signal, thereby generating the image signal to be outputted.

25. The display apparatus according to claim 15,
wherein the display apparatus comprises a light shutter control unit that performs control so that a shutter provided between the display unit and an eye of a user enters a light transmission state at least during a period when the image signal of the first output image is outputted.

26. The display apparatus according to claim 15,
wherein the display apparatus comprises a receiver for generating the image signal of the input image and a synchronization signal from signals sent from outside via the digital transmission path,
wherein the image signal of the input image outputted by the receiver is sent out to an external memory, and
wherein the image signal of the input image is read from the memory based on the synchronization signal, thereby generating the image signal to be outputted.

* * * * *